US008979629B2

(12) United States Patent
Porteaux et al.

(10) Patent No.: US 8,979,629 B2
(45) Date of Patent: Mar. 17, 2015

(54) SCRATCH-CARD GAME SYSTEM AND CORRESPONDING GAME MEDIUM

(75) Inventors: Etienne Porteaux, Paris (FR); Karine Gallerne, Linas (FR); Cécile Keller, Boulogne-Billancourt (FR); Jean-Baptiste Maupas-Oudinot, Paris (FR)

(73) Assignee: La Francaise des Jeux, Boulogne-Billancourt (FR)

( * ) Notice: Subject to any disclaimer, the term of this patent is extended or adjusted under 35 U.S.C. 154(b) by 319 days.

(21) Appl. No.: 12/950,086

(22) Filed: Nov. 19, 2010

(65) Prior Publication Data

US 2011/0124391 A1 May 26, 2011

(30) Foreign Application Priority Data

Nov. 20, 2009 (EP) ..................................... 09306119

(51) Int. Cl.

*G06F 17/00* (2006.01)
*A63F 3/06* (2006.01)
*G07C 15/00* (2006.01)
*G07F 17/32* (2006.01)

(52) U.S. Cl.

CPC ............ *A63F 3/0665* (2013.01); *G07C 15/006* (2013.01); *G07F 17/32* (2013.01); *G07F 17/329* (2013.01)
USPC ............................................................ 463/17

(58) Field of Classification Search

USPC ...................................................... 463/16–25
See application file for complete search history.

(56) References Cited

U.S. PATENT DOCUMENTS

| | | | | |
|---|---|---|---|---|
| 5,628,684 | A | 5/1997 | Bouedec | |
| 7,510,116 | B2 * | 3/2009 | Robb et al. | 235/381 |
| 7,883,405 | B2 * | 2/2011 | Robb | 463/17 |
| 7,887,404 | B2 * | 2/2011 | Saffari et al. | 463/16 |
| 2004/0204222 | A1 | 10/2004 | Roberts | |
| 2005/0064925 | A1 * | 3/2005 | Robb | 463/16 |
| 2006/0214376 | A1 * | 9/2006 | Weller | 273/292 |

FOREIGN PATENT DOCUMENTS

FR 2715576 A1 8/1995

OTHER PUBLICATIONS

Search Report issued May 4, 2010, in related application No. EP 09306119.0

* cited by examiner

*Primary Examiner* — Ronald Laneau
(74) *Attorney, Agent, or Firm* — Young & Thompson

(57) ABSTRACT

The game system is characterized in that it comprises a first instant game based on the purchase by a player of a game medium (1) that in particular bears results information for said first instant game, accessible to the player after removing a first mask and that reveals itself to be either winning (1*b*, 1*c*) or losing (1*a*), the winning result information in the first instant game indicating to the player either a direct winnings (1*b*) on said first instant game, or a right (1*c*) to participate in a second instant lottery game accessible via an instant and automatic lottery computer server means.

18 Claims, 5 Drawing Sheets

SCRATCH-CARD GAME SYSTEM AND CORRESPONDING GAME MEDIUM

The present invention concerns a game system and a game medium for that system.

More particularly, the invention concerns a game system comprising a first instant game based on the purchase by a player of a game medium that in particular bears results information for said first instant game, accessible to the player after removing a first mask and that reveals itself to be either winning or losing.

Such games are commonly called “scratch-card games”.

Such game mediums are for example sold at points of sale of a sales network for this type of tickets under the control of a games management company and allowing each player to uncover results information for said instant game simply by scratching a film concealing the result.

This result can then be a winning or losing result for the game, and in the case of a winning result, the player sees direct winnings printed on the game ticket, these winnings for example taking the form of a number representing the sum won.

This game ticket also bears other information such as, for example, a ticket number such as its manufacturing number, and validation data for the ticket that can also be covered by a second scratch-off mask, this zone also being called VIR for “Void If Removed”.

However, the launch of ephemeral games of this type with short-lasting marketing and the increase in the maximum winnings offered is leading to a decrease in the number of grand prizes offered for this type of scratch-off game.

SUMMARY OF THE INVENTION

The aim of the invention is therefore to resolve these problems by guaranteeing the presence of grand prizes for example throughout the entire duration of marketing of such a game and by animating and revitalizing the offer of scratch-off games by proposing an innovation in gaming practice.

To that end, the invention relates to a game system characterized in that it comprises a first instant game based on the purchase by a player of a game medium that in particular bears results information for said first instant game, accessible to the player after removing a first mask and that reveals itself to be either winning or losing, the winning result information in the first instant game indicating to the player either a direct winnings on said first instant game, or a right to participate in a second instant lottery game accessible via an instant and automatic lottery computer server means.

It will also be noted in this respect that the applicant has already proposed, in document FR-A-2 715 576, a game system with two successive phases, the second phase of the game consisting, for a player having a winning game medium in the first phase, of participating in at least a second game of the video game type on a gaming terminal made available to him.

Although it has a certain similarity in terms of the structure of the game, i.e. participating in a second game on the condition of having a winning ticket in a first game, this document concerns a different game system.

The invention can also have one or several of the following features, considered alone or in combination:

- the first mask is formed by a film masking the result, able to be scratched off by the player to reveal the result information in the first instant game,

- the instant and automatic lottery computer server means is accessible to the player, via means forming an information transmission network from a game station,
- the game station is formed by a computer available to the player and connected to the information transmission network means to allow it to access the instant and automatic lottery computer server means,
- the game station is formed by a mobile communications object belonging to the player able to connect to the information transmission network means to allow him to access means forming the instant and automatic lottery computer server means,
- the game station is formed by a game terminal made available to the player in a game ticket sales office and connected to information transmission network means to access the instant and automatic lottery computer server means,
- the instant and automatic lottery computer server means includes authentication information acquisition and control means for the game medium to validate the access to the second instant lottery game,
- the authentication informations of the game medium also include a ticket number and validation data for said ticket,
- the validation data is covered by a second mask,
- the second mask is formed by a scratch-off masking film.
- the game station includes a man/machine interface means allowing the player to manually introduce, into the instant and automatic lottery computer server means, authentication information for the game medium and to receive, after drawing, the result of the second instant lottery game and the corresponding payment conditions,
- the game station includes automatic reading means for the authentication information of the game medium intended for the instant and automatic lottery computer server means and the man/machine interface means for receiving therefrom, after drawing, the result of a second instant lottery game and the corresponding payment conditions, and
- the game station includes means for printing a receipt of the result of the second instant and automatic lottery game.

According to another aspect, the invention also concerns a game medium intended for a game system as previously described.

BRIEF DESCRIPTION OF THE DRAWINGS

The invention will be better understood using the following description, provided solely as an example and done in reference to the appended drawings, in which.

DETAILED DESCRIPTION OF THE PREFERRED EMBODIMENTS

Figure 1:
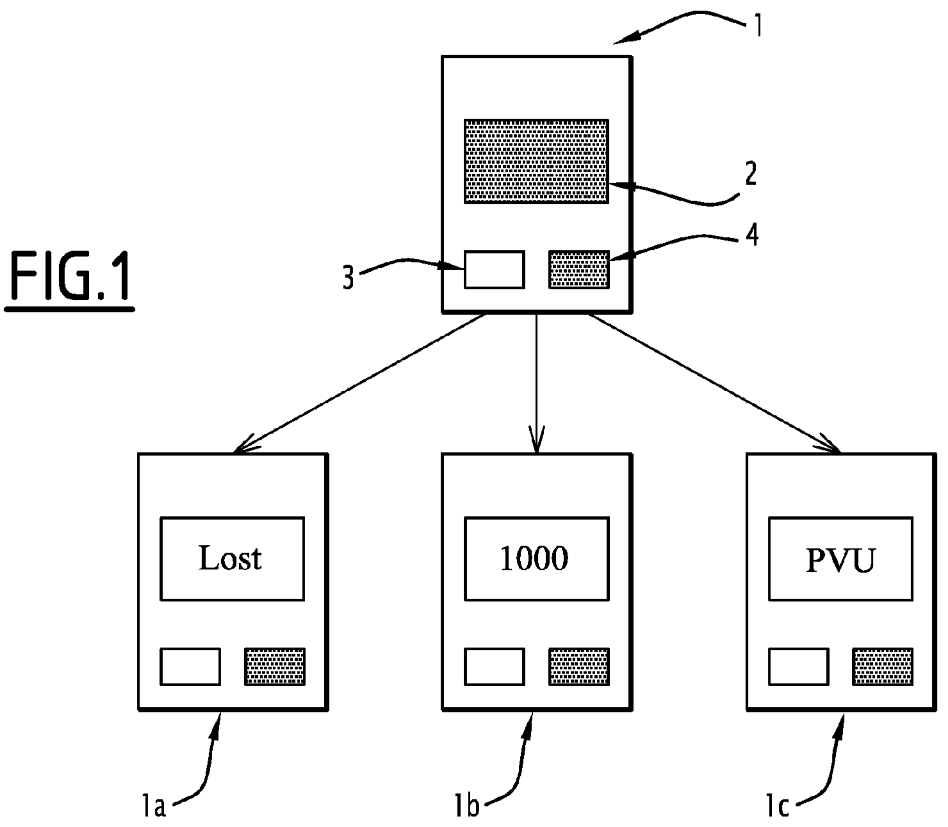
FIG. 1 illustrates a game medium such as a game ticket, intended for a game system according to the invention before and after removal of a first scratch-off mask, respectively.

In FIG. 1, we have shown a game medium such as a game ticket designated by general reference 1 in that figure, intended for a game system according to the invention.

In fact, this game system comprises a first instant game based on the purchase by a player of said game ticket and said game medium in particular bears results information for said first instant game, accessible to the player after removing a first mask, this result revealing itself to be winning or losing.

The game ticket in fact has a game results zone designated by general reference 2 in FIG. 1, which is concealed when the purchase is made by the player, by a film concealing said result, the player being able to scratch off this masking film to uncover the results information in the first instant game.

The game ticket of course bears other information, for example such as a ticket number in a zone designated by general reference 3 in this figure and validation data for the ticket, for example in a zone 4 thereof, this validation data also being able to be covered by a second mask.

This second mask can also be formed by a scratch-off masking film and for example assumes the form of a "Void If Removed" (VIR) zone.

The ticket number can for example correspond to its manufacturing number and other information can be provided on the ticket.

Indeed, in the game system according to the invention, the result information for said first instant so-called scratch off game, accessible to the player after removing said first mask, can reveal itself to be losing or winning, as illustrated in FIG. 1.

In fact, the player can see, after scratching off the film concealing the result, losing result information as illustrated for ticket 1*a* illustrated in FIG. 1, or a winning result for the first instant game as illustrated for the tickets designated by references 1*b* and 1*c* in FIG. 1.

This winning result can then be a direct winnings information for the first game, as shown for ticket 1*b*, or a right to participate in a second instant lottery game accessible on instant and automatic lottery computer server means, as shown for ticket 1*c*.

In this case, the player sees, for ticket 1*b*, direct winnings in the form of an amount won or, for ticket 1*c*, an indication such at PVU (Prize Value Unknown), for example, indicating to the player that the ticket is a winning ticket and inviting him to participate in the second instant lottery game to determine his winnings by drawing by triggering the lottery server.

Figure 2:
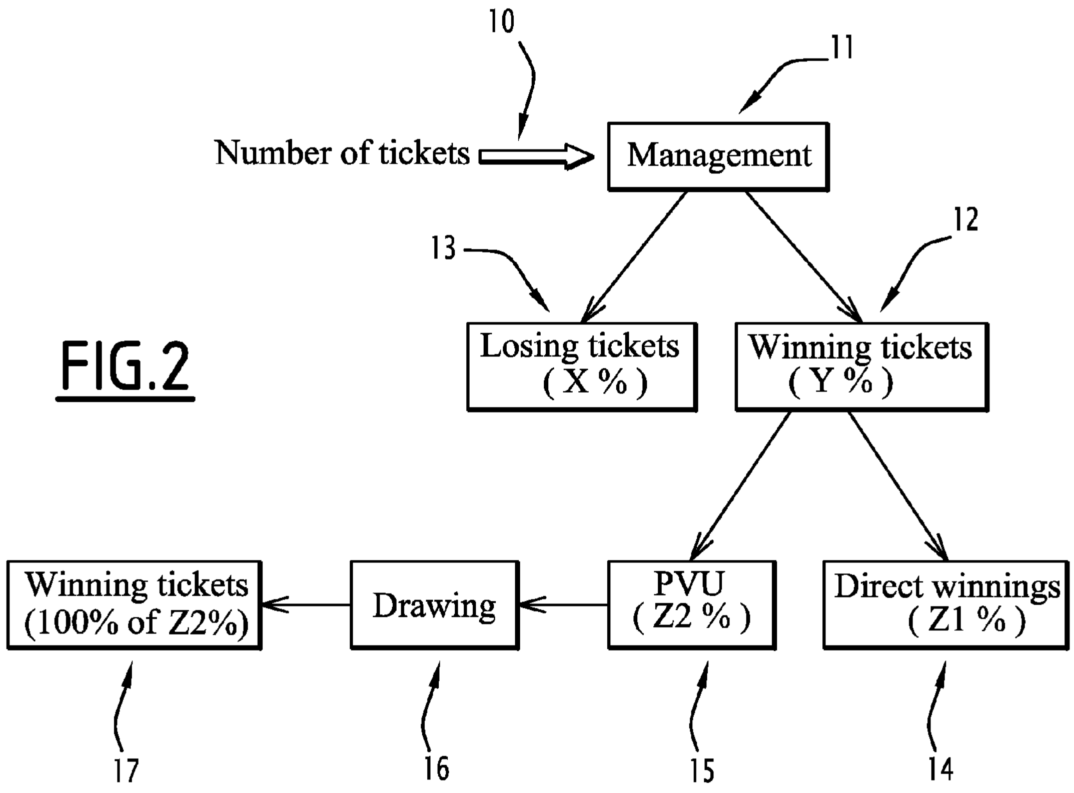
FIG. 2 shows a synoptic diagram illustrating the distribution of the results in a game system according to the invention.

The distribution of winning and losing tickets is illustrated in FIG. 2 and one sees that out of the total number of tickets, as designated by general reference 10 in FIG. 2, the management entity for the game as designated by general reference 11 defines a distribution, for example in percentage of winning tickets 12 and losing tickets 13.

The entity also defines, in the winning tickets, those with direct winnings as designated by general reference 14, and those entitling the player to participate in the second instant lottery game, designated by general reference 15 and bearing corresponding information such as PVU, for example. Only those players having a winning ticket identified, for example, with the designation PVU, may participate in the second instant lottery game, 15, as shown in FIG. 2.

These tickets then allow the players to participate in a drawing as illustrated in 16, to determine corresponding winnings, as illustrated in 17, these winnings being communicated to the players.

As previously indicated, the second instant lottery game is accessible to the players on the instant and automatic lottery computer server means.

The lottery mechanism itself not being the object of the invention, we will not describe it in more detail below. We will simply note that it can be based on any traditional drawing structure.

Figure 3:
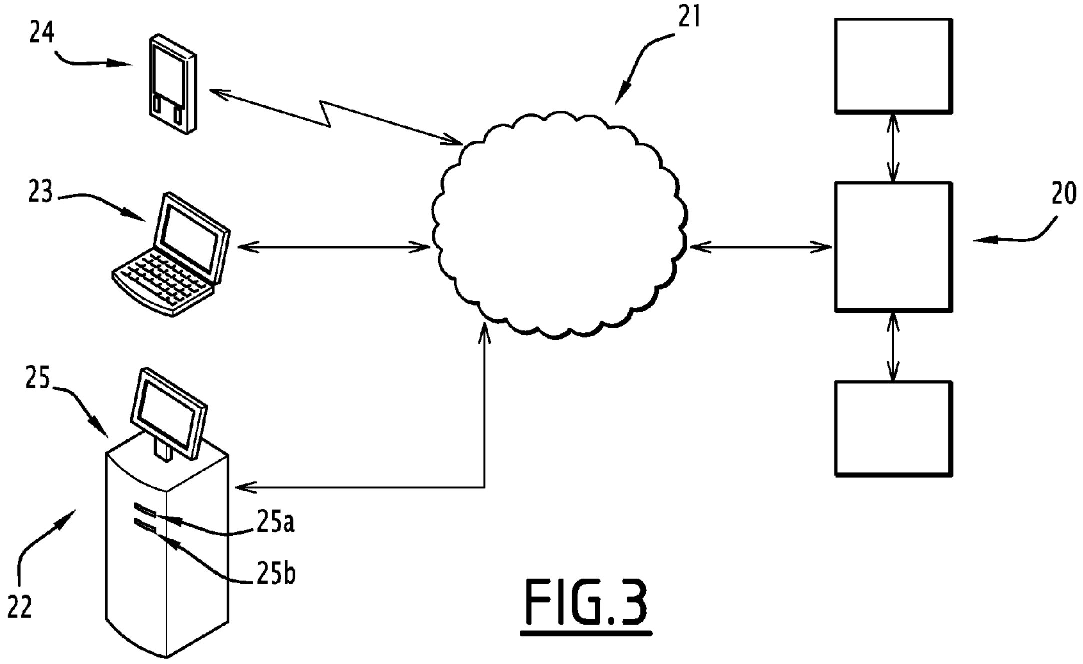
FIG. 3 shows a synoptic diagram of different means implemented in a game system according to the invention.

Indeed and as illustrated in FIG. 3, this server, which is designated by general reference 20 in that figure, is accessible to players through an information transmission network designated by general reference 21, from a game station designated by general reference 22.

In fact, different types of game stations can be contemplated.

Thus for example, this game station can be made up of a computer 23 available to the player and connected to the information transmission network means to allow the player to access the instant and automatic lottery computer server means through a corresponding access site.

The game station can also be formed by a mobile communication object belonging to the player as designated by general reference 24 in FIG. 3, for instance made up of a PDA, mobile telephone or "smart phone" device, and able to connect to the information transmission network means to allow the player to access the server means.

Players are offered another possibility, i.e. to go through a game terminal made available to said players for example in a game ticket sales office and also connected to the information transmission network means to access the computer server means.

This game terminal is for example designated by reference 25 in FIG. 3 and for example includes a scanner 25*a* or any other type of optical reading means, ticket scanning means, and a receipt printer 25*b*, the functions of which will be described in more detail below.

In the illustrated embodiment, this terminal is connected to the information transmission network 21.

This can for example be the Internet network, but it of course goes without saying that private networks can also be defined between the site hosting the server means 20 and the various game terminals made available to the players in the various game ticket sales offices.

Figure 4:
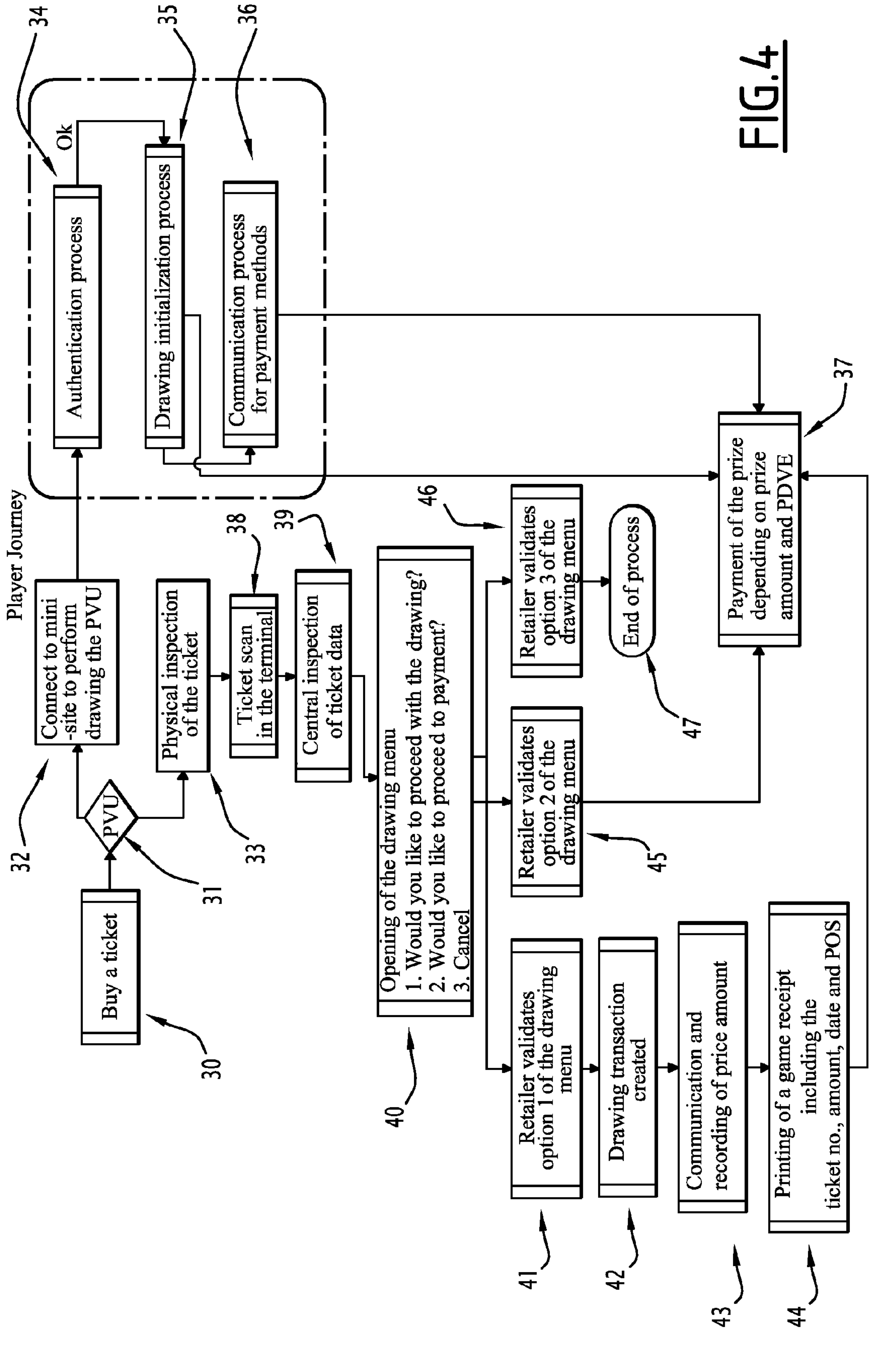
FIG. 4 shows a flowchart illustrating the progression of a game system according to the invention.

The process for accessing the server means is illustrated in FIG. 4, where we see that after having purchased a game medium such as a game ticket, in 30, the player, after scratching off a first mask, discovers that the game ticket bears a result such as PVU, for example, corresponding to a right to participate in a second instant lottery game in 31. The player can choose to access this second game either by connecting directly to the instant and automatic lottery computer server means via his own means, i.e. through his computer or communications object, as illustrated in 32, or of going through a game terminal made available to said player in a game ticket sales office, as illustrated in 33.

In the case where the player decides to connect directly to the game server using his own means, from step 32, a dialogue is then established between the server and the player through a man/machine interface means of his computer or communications object, making it possible first to implement an authentication method of the ticket, as designated by general reference 34 in this figure, by using authentication information from the game medium to validate access to the second instant game.

As will be described in more detail later, this authentication information can also include the ticket number and the validation data thereof, as borne by the game medium and described in reference to FIG. 1.

Once the authentication process is validated, the second instant lottery drawing game is launched in 35, in order to obtain the result corresponding to the drawing and trigger a process for communicating that result to the player, for example accompanied by corresponding payment conditions, as illustrated by general reference 36, which makes it possible, in 37, to trigger the payment of the winnings to the player as a function of the criteria in force and established by the game's manager.

On the contrary and as previously indicated, the player can also decide to go, in 33, though a game terminal made available to him in a corresponding sales office.

This terminal can then be implemented by a retailer or any operator, for instance. The player then gives his game ticket to the retailer, who proceeds with a physical inspection of the game ticket, before placing the ticket in automatic reading means for the various information borne by the game ticket and in particular authentication information thereof, for example by introducing it into the scanner 25*a* of the terminal 25 described in reference to FIG. 3.

The various information acquired is then transmitted by the game terminal to the instant and automatic lottery computer server means as illustrated in 38.

In 39, the computer server proceeds with inspections of the data from the game ticket in order to validate access to the second instant game. A dialogue then opens between said server and the man/machine interface means of the game terminal, for example offering the retailer a choice between various options, for instance, in 40.

These options may for example consist of:

proceeding with a drawing, proceeding with a payment, or canceling the operation.

If the retailer selects the first option from this menu, i.e. triggers the drawing 41, a drawing transaction is created between the game terminal and the server, in 42, so as to allow the server to proceed with the drawing and communicate the amount won, in 43, to the game terminal.

The game terminal then triggers the printing of a results receipt for the second game, in 44, and thereby allows the payment of the winnings by circling back to step 37 previously described.

The printing of the receipt is for example done by the printer 25*b* integrated into the game terminal 25 as described relative to FIG. 3.

This step 37 is also directly accessible from step 40 if the retailer validates a winnings payment option in 45.

If the retailer validates the third option in the menu in 46 from step 40, he ends the communication process.

Figure 5:
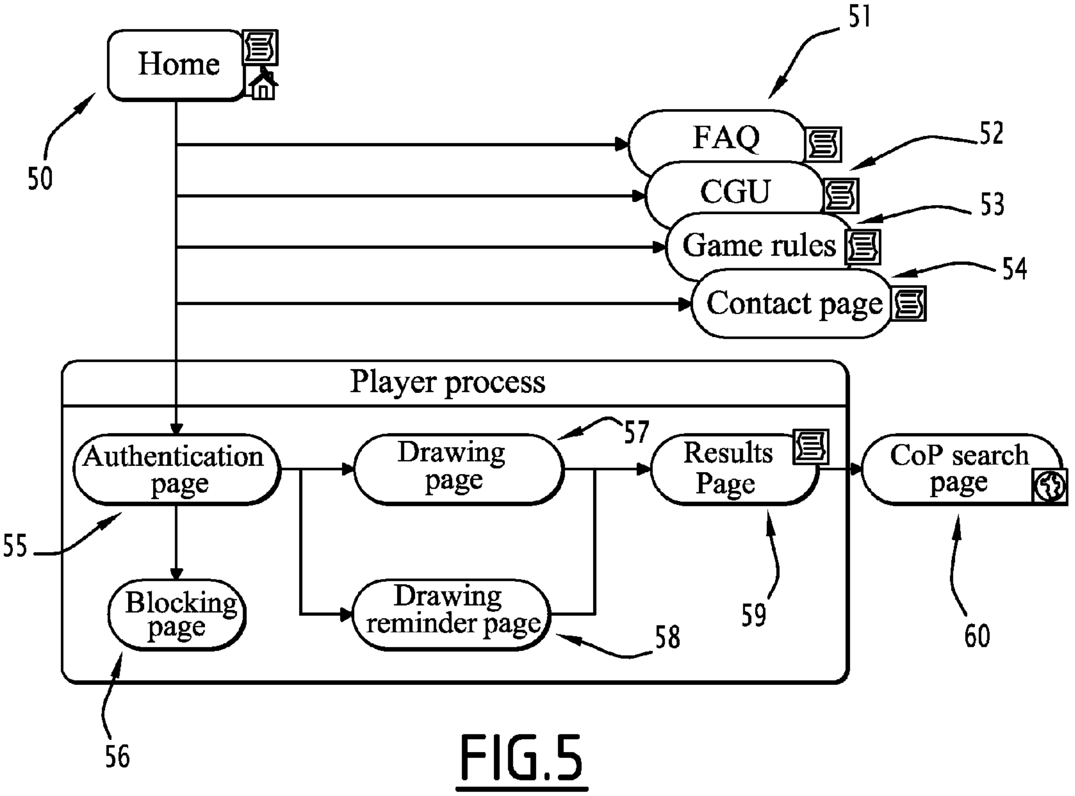
FIG. 5 illustrates the different pages shown to a player when he accesses a second instant lottery game in a game system according to the invention.

The server access scenario is for example illustrated in FIG. 5, where we see that after a home page 50, providing access to different sections as designated by references 51, 52, 53 and 54 in that figure, for example, and corresponding to question/answer, rules, contact, etc. . . . sections for instance, the game station allows access to an authentication page designated by general reference 55, which, if this authentication is not validated, leads to a blockage page designated by general reference 56.

However, if the authentication is validated, the station accesses a drawing page designated by general reference 57, or even a drawing reminder page designated by general reference 58, before accessing a results page designated by general reference 59.

Additional pages such as page 60 can also be considered, to obtain information on the site relative to sales offices, for example, or other payment centers for winnings.

In light of this, depending on the game station used by the player, the station can have a man/machine interface means allowing the player to manually enter the various authentication information for the game medium into the instant and automatic lottery computer server means and to received therefrom, after drawing, the results of the second instant lottery game and the corresponding payment conditions.

However, it is also possible for the player to go through a game station that includes means for automatically reading the authentication information of the game ticket, intended for the instant and automatic lottery computer server means and the man/machine interface means for receipt thereof, after drawing of the result of the second lottery game and the corresponding payment conditions.

The game station can then be associated with means for printing a receipt that will be described in more detail below.

The man/machine interface means has any suitable structure with a monitor, keyboard, mouse, touch screen, etc. . . .

Figure 6:
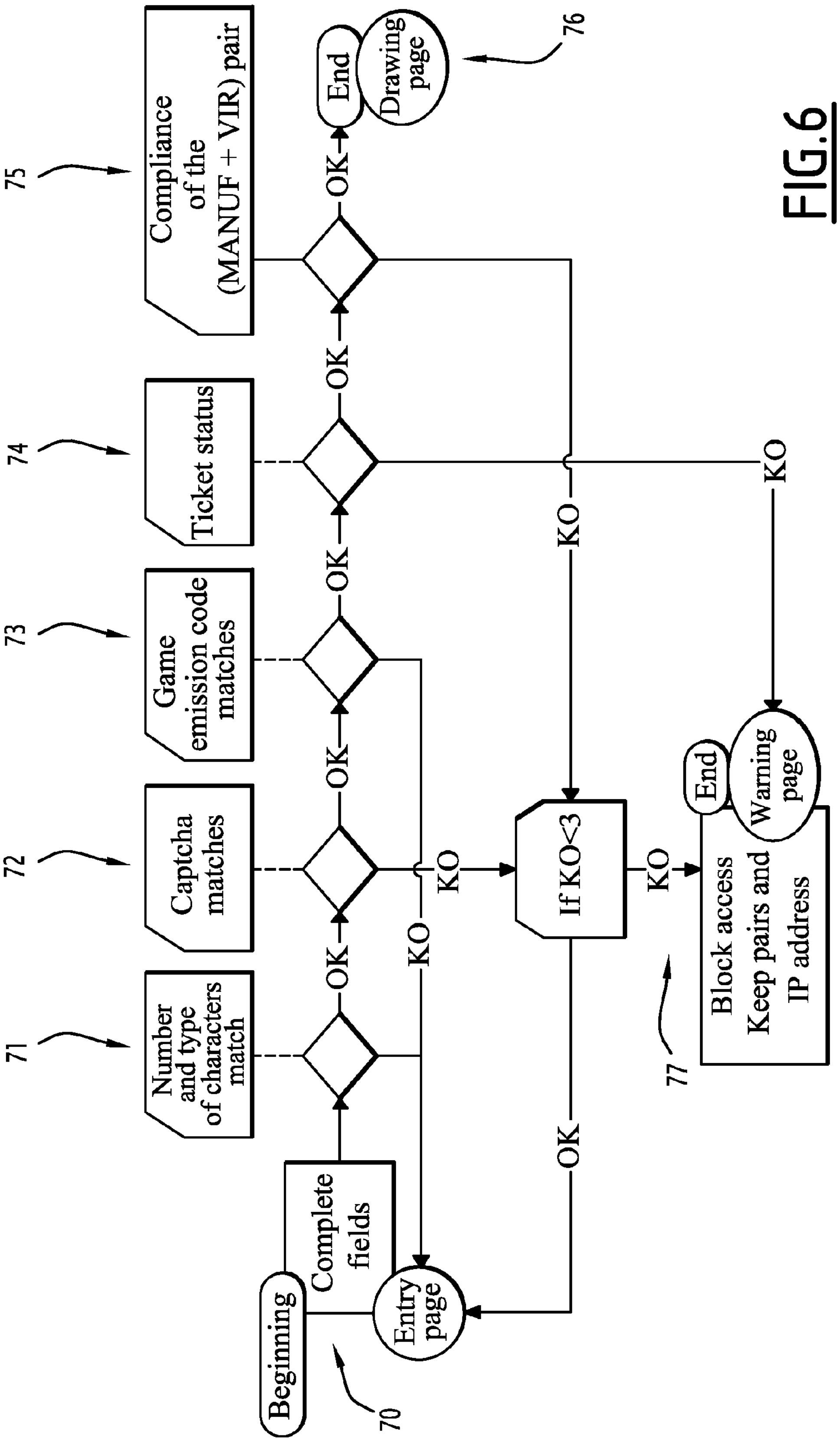
FIG. 6 illustrates the different steps for authenticating a game medium in a game system according to the invention.

The authentication process can also include several inspection steps, as illustrated in FIG. 6.

In fact, the first step of this authentication process consists, in 70, of entering the authentication information from the game ticket, e.g. the ticket number made up of any manufacturing number thereof and validation data for the ticket, for example accessible after scratching off the second mask or even by reading through said mask, traditionally, into the server means.

A first access validation step can then consist of verifying that the number and the type of characters entered or read match, as illustrated by step 71.

A rejection test by verifying a code to be copied of the "CAPTCHA" type can also be done in step 72, before a compliance test of a game-emission code in 73 and a ticket status inspection in 74, before checking, in 75, the compliance of the ticket number pair, e.g. such as its manufacturing number, and validation data of said ticket as concealed for example in the so-called VIR zone or any other zone of that type bearing another appropriate note, before going to the drawing page for example in 76.

In the event the various tests previously described are failed, a traditional process making it possible to re-request the information a certain number of times or block access or issue a warning page can also be contemplated, as illustrated generally by step 77.

Figure 7:
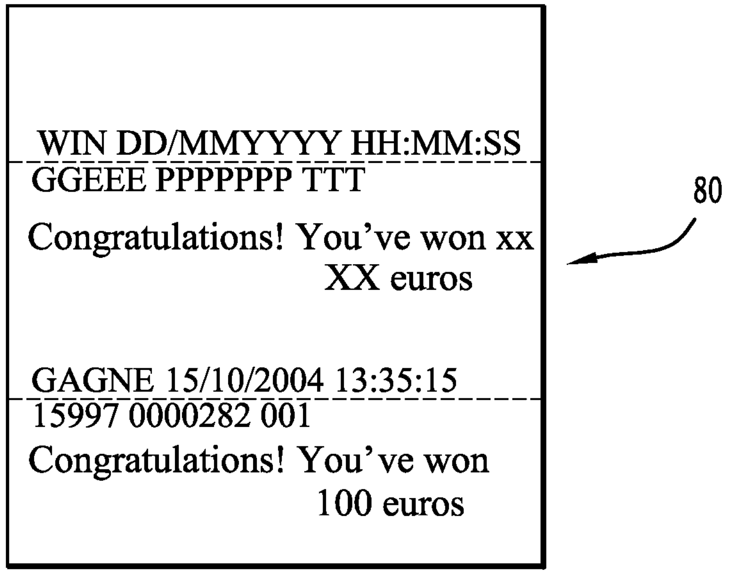
FIG. 7 shows an embodiment of a results receipt for the second instant and automatic lottery game of a game system according to the invention.

Lastly, FIG. 7 shows a results receipt for the second instant and automatic lottery game, designated by general reference 80 and bearing certain information related to the winnings, etc. . . .

As previously indicated, the drawing mechanism for the second lottery game is not the object of the invention and can assume any suitable form making it possible for example to maintain the interest of the game, by proposing, throughout the entire marketing duration of the game, grand prizes, etc. . . . .

This game system then has a certain number of advantages inasmuch as it makes it possible to keep players' interest by allowing them to participate, for example, in a second instant lottery game and by allowing them to win grand prizes throughout the entire marketing duration of the game. Thus the winnings level for the "Prizes of Unknown Value" can be an integral part of a prize table of the game and give players a non-zero chance, during the drawing, of accessing all prize levels or part of those prize levels, as provided in the prize table.

Of course, embodiments different from those described, in particular of the game medium, can be contemplated.

Thus for example, the first and second masks previously described can be integrated into a first zone of the game medium to form a single game zone.

The invention claimed is:

1. A game, comprising:

a game medium including a game ticket for a player playing a first instant game, the game ticket including a first mask configured to be scratched off by the player, the first mask, when scratched off, revealing a result of playing the first instant game, wherein, in the event that the result is a first winning result, said winning result comprises visual information on the game ticket of a designation of a right to participate in a second instant game, different from the first instant game, via an instant and automatic lottery computer, the designation sufficient to cause the lottery computer, when received by said lottery computer as input, to enter the player into the second instant game, and wherein, in the event that the result is a losing result, said losing result provides the player with no information of any designation of any right to participate in the second instant game.

2. The game according to claim 1, wherein the first mask is formed by a film masking the result.

3. The game according to claim 1, wherein the instant and automatic lottery computer is accessible to the player via an information transmission network from a game station.

4. The game according to claim 3, wherein the game station is formed by a computer available to the player and connected to the information transmission network to allow access to the instant and automatic lottery computer.

5. The game according to claim 3, wherein the game station is formed by a mobile communications object operable by the player and in communication with the information transmission network that permits communications access to the instant and automatic lottery computer.

6. The game according to claim 3, wherein the game station is formed by a game terminal made available to the player in a game ticket sales office and connected to the information transmission network to access the instant and automatic lottery computer.

7. The game according to claim 3, wherein the game station includes a man/machine interface means allowing the player to manually introduce, as input to the instant and automatic lottery computer, authentication information for the game medium and to receive, after the drawing, the result of the second instant game and corresponding payment conditions.

8. The game according to claim 3, wherein the game station includes automatic reading means for the authentication information of the game medium for the instant and automatic lottery computer and the man/machine interface means for receiving, after the drawing, the result of the second instant game and corresponding payment conditions.

9. The game according to claim 3, wherein the game station includes means for printing a receipt of the result of the second instant game.

10. The game according to claim 1, wherein the instant and automatic lottery computer includes authentication information acquisition and control means for the game medium to validate access to the second instant game.

11. The game according to claim 10, wherein the authentication information of the game medium includes a ticket number and validation data for the game ticket.

12. The game according to claim 11, wherein the validation data is covered by a second mask.

13. The game according to claim 12, wherein the second mask is formed by a scratch-off masking film.

14. The game according to claim 1, wherein, in the event that the result is a second winning result, different from said first winning result, said second winning result comprises a visual designation on the game ticket of a winnings in a form of an amount won.

15. A method of playing a game, the method steps comprising:

providing a game medium including a game ticket for a player to play a first instant game, the game ticket including a first mask configured to be scratched off by the player for playing the game;

scratching, by the player, the first mask in order to remove said first mask from the game medium to uncover a result of the first instant game;

in the event that the result is a first winning result, performing the sub-steps of providing the player, by way of a visual indication uncovered by way of said scratching, with a visual designation on the game ticket to participate in a second instant game, and entering an information from said visual indication into a lottery computer as input to said lottery computer, said information being sufficient to cause said lottery computer to enter the player into a second instant game that comprises a drawing to determine winnings for winning the first instant game; and in the event that the result is a losing result, no designation to participate in the second instant game is provided to the player.

16. The method according to claim 15, wherein, in the event that the result is a second winning result, different from said first winning result, performing the sub-step of providing the player, by way of another visual indication uncovered by way of said scratching, with information of a winnings in a form of an amount won.

17. A game system, comprising:

a first instant game based on a purchase by a player of a game medium that bears results information for said first instant game accessible to the player after removing a first removable mask from the game medium, wherein a first winning result information in the first instant game comprises an indication to the player of a right to participate in a second instant lottery game accessible via a lottery computer, said indication being sufficient to cause the lottery computer when received by said lottery computer as input to enter the player into the second instant game, and wherein a losing result information in the first instant game comprises no indication of any winnings and no indication of any right to participate in the second instant game.

18. The game system according to claim 17, wherein a second winning result information in the first instant game, different from the first winning result of the first instant game, comprises a visual designation on the game ticket of a winnings in a form of an amount won, but provides the player with no indication of any right to participate in the second instant game.

* * * * *